(12) United States Patent
Lu (10) Patent No.: US 7,833,090 B2
(45) Date of Patent: Nov. 16, 2010

(54) METHOD OF MANUFACTURING FERRULE ASSEMBLIES

(75) Inventor: Yu Lu, Westborough, MA (US)

(73) Assignee: ADC Telecommunications, Inc., Eden Prairie, MN (US)

(*) Notice: Subject to any disclaimer, the term of this patent is extended or adjusted under 35 U.S.C. 154(b) by 0 days.

(21) Appl. No.: 12/459,967

(22) Filed: Jul. 9, 2009

(65) Prior Publication Data

US 2009/0275267 A1   Nov. 5, 2009

Related U.S. Application Data

(62) Division of application No. 11/649,347, filed on Jan. 3, 2007, now Pat. No. 7,566,259.

(51) Int. Cl.
*B24B 7/24* (2006.01)
(52) U.S. Cl. ........................... 451/42; 451/390
(58) Field of Classification Search .................. 451/41, 451/42, 57, 58, 391, 390, 386, 384
See application file for complete search history.

(56) References Cited

U.S. PATENT DOCUMENTS

| | | | |
|---|---|---|---|
| 4,492,060 A * | 1/1985 | Clark | 451/41 |
| 4,539,776 A | 9/1985 | Weaver, Jr. | |
| 4,693,035 A * | 9/1987 | Doyle | 451/278 |
| 4,819,386 A | 4/1989 | Struyf | |
| 5,321,917 A | 6/1994 | Franklin et al. | |
| 5,464,361 A | 11/1995 | Suzuki et al. | |
| 5,547,418 A | 8/1996 | Takahashi | |
| 5,743,785 A | 4/1998 | Lundberg et al. | |
| 5,743,787 A * | 4/1998 | Ishiyama et al. | 451/41 |
| 6,396,996 B1 | 5/2002 | Carpenter et al. | |
| 6,632,026 B2 | 10/2003 | Baba et al. | |
| 6,957,920 B2 * | 10/2005 | Luther et al. | 385/85 |
| 7,137,878 B2 * | 11/2006 | Yamada et al. | 451/367 |
| 7,566,259 B2 | 7/2009 | Lu | |

* cited by examiner

*Primary Examiner*—Robert Rose
(74) *Attorney, Agent, or Firm*—Merchant & Gould P.C.

(57) ABSTRACT

A method of manufacturing a ferrule assembly. The method including first and second polishing operations. The first polishing operation including polishing only the end face of a ferrule of an assembly. The second polishing operation including polishing only the optical fiber of the assembly.

4 Claims, 6 Drawing Sheets

FIG. 4
Detail A

FIG. 8
Detail B

METHOD OF MANUFACTURING FERRULE ASSEMBLIES

CROSS-REFERENCE TO RELATED APPLICATIONS

This application is a divisional application of U.S. application Ser. No. 11/649,347, filed Jan. 3, 2007 now U.S. Pat. No. 7,566,259; which application is incorporated herein by reference.

FIELD OF THE INVENTION

This disclosure relates to methods and devices for use in the telecommunications industry. More specifically, this disclosure relates to methods and devices for manufacturing multi-fiber ferrule assemblies having polished optical fibers.

BACKGROUND OF THE INVENTION

A multi-fiber ferrule assembly generally includes a ferrule and a number of optical fibers that are held by the ferrule. Multi-fiber ferrule assemblies are utilized in fiber optic connectors. In use, fiber optic connectors interconnect to one another for the transmission or transference of signals. In order to effectively interconnect or mate fiber optic connectors, the ends of the optical fibers of the connectors are generally brought into direct contact with one another. The optical fibers can project outward from the front face of the ferrule assemblies to aid in establishing the direct contact between the fibers of the connectors.

In conventional manufacturing processes, the optical fibers of the multi-fiber ferrule assemblies are first polished or ground flush with the front face of the ferrules. The front faces of the ferrules are then subsequently ground or polished away from the optical fibers so that the fibers extend a distance beyond the front face. In some processes, this step involves using slurry or flock film material to polish both the optical fiber and the ferrule. Because the ferrule material (e.g., plastic) is softer than the optical fiber, the front face of the ferrule wears or grinds away more quickly than the optical fiber. The optical fiber accordingly projects outward from the front face of the ferrule.

As the ferrule material wears away or recedes, the height of the optical fiber increases, and more and more polishing force is applied to the optical fiber than to the front face of ferrule. The increasing polishing force can accelerate the rate at which material from the optical fiber is removed; accordingly, the distance differential between the optical fiber height and the front face is limited. Such conventionally manufacture ferrule assemblies typically have optical fibers that extend a distance of 3 micrometers or less beyond the front face of the ferrule.

In some applications, the distance of 3 micrometers or less is not sufficient to establish direct contact between fiber optic connectors, thereby resulting in poor signal transmission. In general, conventional methods for manufacturing multi-fiber ferrule assemblies can be improved.

SUMMARY OF THE INVENTION

The present disclosure relates to methods of manufacturing ferrule assemblies. The method includes pre-polishing blank ferrules in a first polishing operation and polishing optical fibers of loaded ferrules in a second polishing operation. In one variation of the method, optical fibers of a first group of pre-polished ferrules are polished simultaneously with end faces of a second group of un-polished ferrules. In another variation of the method, optical fibers of pre-polished ferrules are polished on a tool having a spacer.

In either variation of the present method, the optical fibers are polished to a desired fiber height without removing material from the associated ferrule. That is, two polishing operations are utilized to manufacture the multi-fiber ferrule assembly: a first polishing operation wherein only the ferrule is polished, and a second operation wherein only the optical fiber is polished. As will be described in greater detail, this process produces ferrule assemblies having an increased fiber height. Features of the variations of the present method also include providing an indication of the fiber height during polishing operations.

A variety of examples of desirable product features or methods are set forth in part in the description that follows, and in part will be apparent from the description, or may be learned by practicing various aspects of the disclosure. The aspects of the disclosure may relate to individual features as well as combinations of features. It is to be understood that both the foregoing general description and the following detailed description are explanatory only, and are not restrictive of the claimed invention.

DETAILED DESCRIPTION

Reference will now be made in detail to exemplary aspects of the present disclosure that are illustrated in the accompanying drawings. Wherever possible, the same reference numbers will be used throughout the drawings to refer to the same or like parts.

Figure 1:
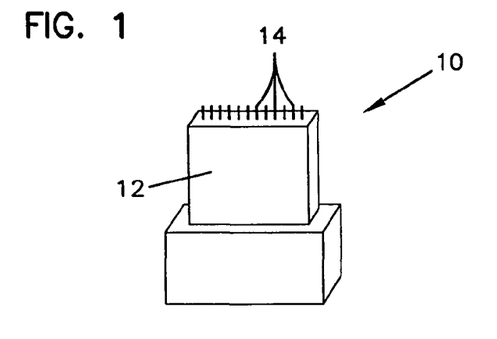
FIG. 1 is a (front view) schematic representation of a multi-fiber ferrule assembly manufactured in accordance with the principles disclosed.

Referring to FIG. 1, the present disclosure relates to methods of manufacturing a multi-fiber ferrule assembly 10 for use in a fiber optic connector. The ferrule assembly 10 generally includes a ferrule 12 configured to hold a plurality of optical fibers 14. The method involves pre-polishing blank ferrules 12 in a first polishing operation, and then polishing the optical fibers 14 of loaded ferrules (i.e., pre-polished ferrules that hold optical fibers) in a second polishing operation.

Figure 2:
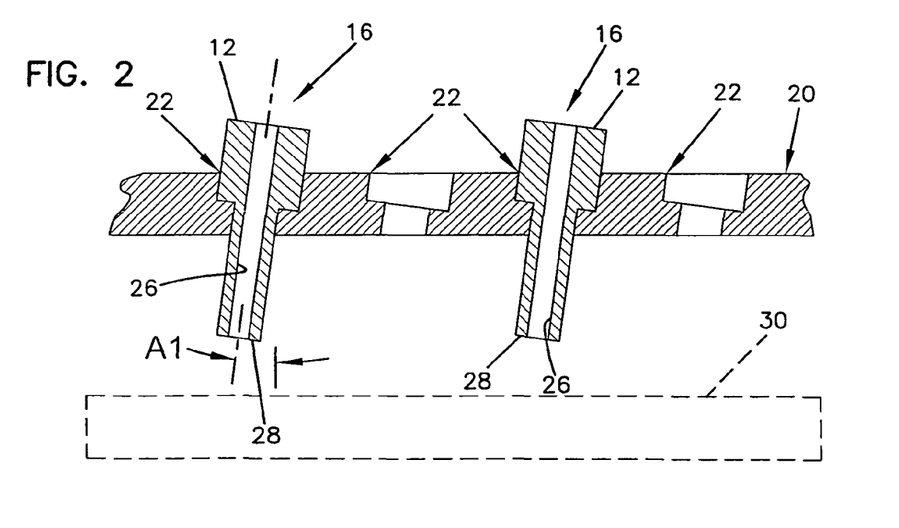
FIG. 2 is a (side view) schematic representation of a ferrule holding tool and a polisher, the ferrule holding tool including a first grouping of blank ferrules, in accordance with the principles disclosed.

Referring to FIG. 2, a ferrule holding tool 20 and a polisher 30 are schematically represented. As will be understood, various types of ferrule holding tools and polishers can be used in accordance with the principles of the methods disclosed. The ferrule holding tool 20 defines a plurality of ferrule holding locations 22. In one embodiment, the ferrule holding locations 22 are defined by through bores corresponding in shape and size to the ferrules 12. Typically, the tool 20 defines ten to twelve ferrule holding locations 22; however, the plurality of ferrule holding locations can include a greater or lesser number of ferrule holding locations.

In the illustrated ferrule representation of FIG. 2, the ferrules 12 are shown schematically from the side such that the array of optical fibers 14 (shown in FIG. 1) extends into the illustration. While the present method is describe with respect to ferrules configured to hold multiple optical fibers 14, it is to be understood that the present method can also be applied to the manufacture of ferrules configured or constructed to receive only a single optical fiber. Further, while the illustrated multi-fiber ferrule assembly 10 (FIG. 1) is shown with twelve optical fibers 14, it is to be understood that the disclosed method applies similarly to multi-fiber ferrule assemblies having a greater or lesser number of optical fibers.

Referring then still to FIG. 2, in the present method of manufacturing ferrule assemblies, a grouping or number of first ferrules 16 is positioned within a corresponding number of ferrule holding locations 22. In FIG. 2, only a partial number of the ferrule holding locations 22 are shown. Typically, the number of first ferrules 16 positioned within the tool 20 is equal to half the number of ferrule holding locations 22. In one method, the first ferrules 16 of the grouping are positioned in alternating locations such that empty ferrule holding locations are provided between occupied ferrule holding locations, as shown in FIG. 2. By alternating the locations of the first ferrules, pressure or polishing forces applied by the polisher 30 are more uniformly distributed across the grouping of first ferrules 16.

Figure 3:
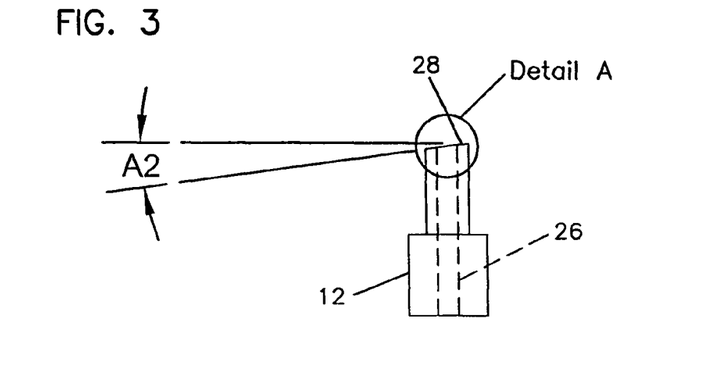
FIG. 3 is a (side view) schematic representation of a blank ferrule after being polished by the polisher of FIG. 2.

In this initial step, the first ferrules 16 are empty or blank ferrules. That is, none of the ferrules 16 have received or hold optical fibers 14. With the blank first ferrules 16 positioned within the ferrule holding locations 22, a first polishing operation is performed. Referring to FIGS. 2 and 3, during the first polishing operation, a front end face 28 of each of the blank ferrules 16 is simultaneously ground or polished.

Figure 4:
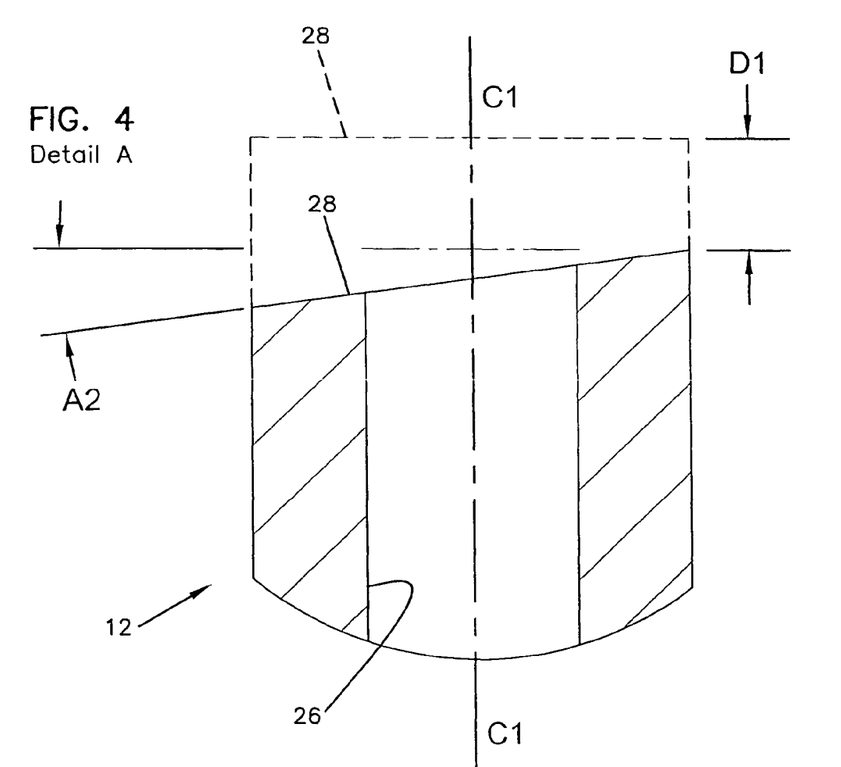
FIG. 4 is an enlarged cross-sectional representation of a portion of the polished blank ferrule of FIG. 3.

In the illustrated method, the unpolished ferrules 12 have standard, flat end faces 28 (FIG. 2). The ferrule holding tool 20 is constructed such that the ferrules 12 positioned within the ferrule holding locations 22 are oriented at an angle A1 (FIG. 2) relative to the polisher 30; the end faces 28 of the ferrules being polished at a corresponding angle A2 (FIG. 4). In one embodiment, the angle A2 at which the end faces 28 of the ferrules 12 are polished is between 5 and 10 degrees; in the illustrated embodiment, the end faces 28 are polished at an angle A2 of about 8 degrees. In an alternative polishing operation set up, the ferrules 12 may be oriented in a non-angled or vertical orientation, and the polisher 30 oriented in an angular orientation.

Referring now to FIGS. 2-4, during the first polishing operation, a depth D1 (FIG. 4) of material is removed from the flat end face (represented by dashed lines) of each of the blank ferrules 12. The depth D1 is defined along a centerline C1-C1 of the ferrule 12. In one method, the depth D1 is approximately 170 micrometers at the centerline C1-C1 of the ferrule when the end face 28 is polished at an angle A2 of about 8 degrees.

After the first polishing operation, the grouping of polished, angled, blank ferrules 16 is removed from the tool 20. The optical fibers 14 are then inserted into through bores 26 formed in the ferrules. Each of the ferrules 12 and the associated optical fiber 14 are secured relative to one another, typically by an epoxy or other adhesive.

Figure 5:
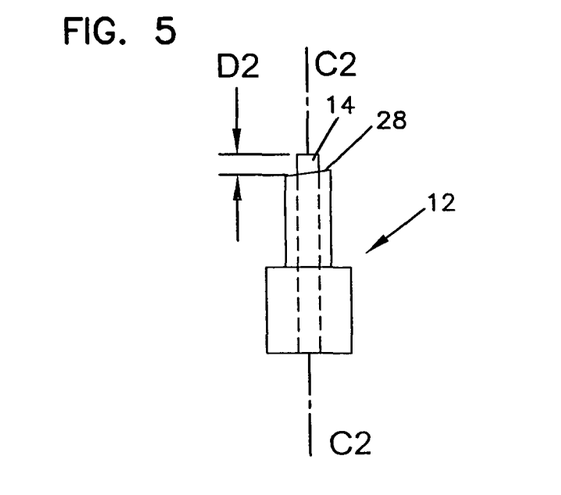
FIG. 5 is a (side view) schematic representation of a loaded ferrule having optical fibers inserted within the ferrule of FIG. 3.
Figure 8:
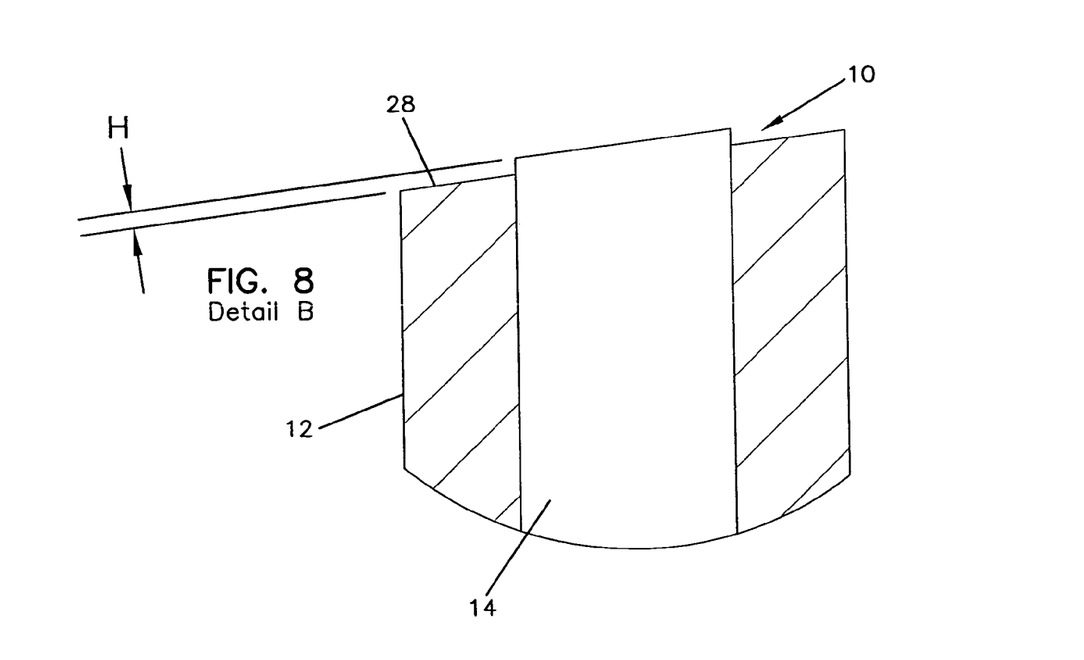
FIG. 8 is an enlarged view of a portion of the completed, polished ferrule assembly of FIG. 7.

Referring now to FIG. 5, the optical fibers 14 are secured relative to the ferrule 12 such that the optical fibers 14 extend a distance D2 beyond the polished end face 28 of the ferrule. The distance D2 is defined as the distance from the end face 28 of the ferrule to the end of the optical fiber 14 when taken along a centerline C2-C2 of the optical fiber 14. Preferably, the distance D2 is greater than that of a desired end height H (FIG. 8) of the optical fibers of the finished ferrule assembly 10. In one method, the optical fibers 14 are cleaved to extend the distance D2 beyond the end face 28 of the ferrule. In another method, the optical fibers 14 are simply positioned to extend the distance D2 beyond the end face 28 of the ferrule 12.

With the optical fibers 14 inserted and secured within the through bores 26 of the ferrules, the ferrules are no longer blank; the ferrules are instead "loaded" ferrules. The grouping of loaded first ferrules 16 is then again positioned in the ferrule holding locations 22 of the tool 20 (see FIG. 6). Preferably, each of the loaded first ferrules 16 is positioned in the same location 22 and orientation as that at which the ferrule was initially polished during the first polishing operation. By re-positioning the ferrules in the same location 22 of the tool 20, and in the same orientation, dimensional tolerances of each individual ferrule holding location of the tool and the dimensional tolerances of each individual ferrule are better managed.

Figure 6:
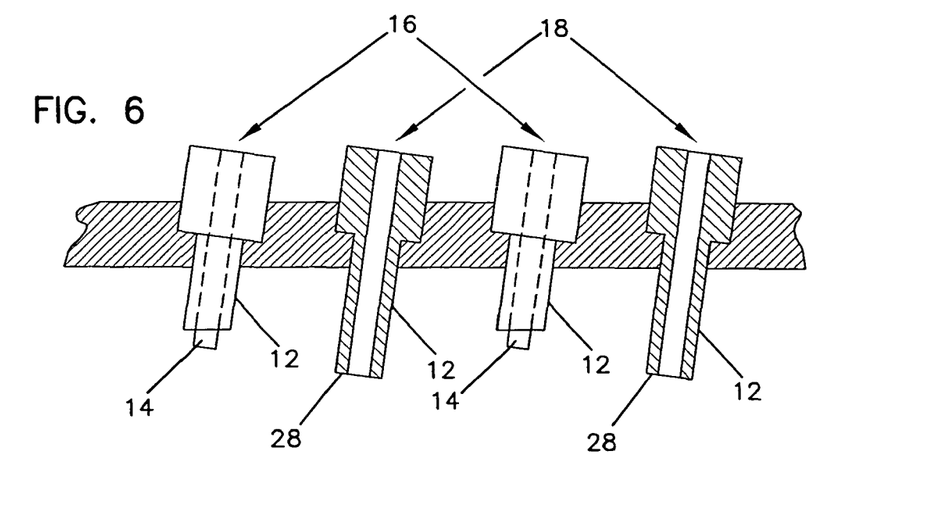
FIG. 6 is a (side view) schematic representation of the ferrule holding tool of FIG. 2, the ferrule holding tool including the first grouping of loaded ferrules and a second grouping of blank ferrules.

Referring to FIG. 6, in one variation of the present method, the next step of manufacturing includes positioning a second grouping or number of blank second ferrules 18 within a corresponding number of ferrule holding locations 22, along with the grouping of loaded first ferrules 16. Typically, the number of second ferrules 18 positioned within the tool 20 is equal to the remaining number of empty ferrule holding locations.

With both the grouping of blank second ferrules 18 and the grouping of loaded first ferrules 16 positioned within the ferrule holding locations 22 of the tool 20, a second polishing operation is performed.

Figure 7:
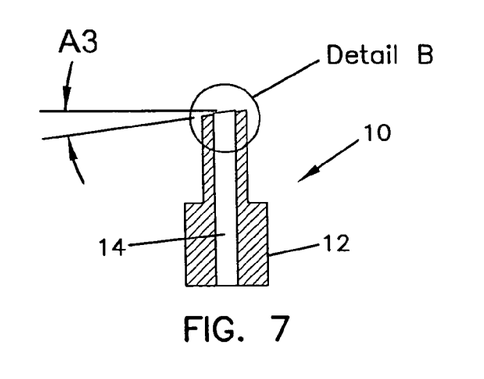
FIG. 7 is a (side view) schematic cross-sectional representation of the completed, polished ferrule assembly of FIG. 1.

In the second polishing operation, the end faces 28 of each of the blank second ferrules 18 is ground or polished to the angle A2, as previously described (see FIGS. 3 and 4). During this same second polishing operation, the optical fibers 14 of the loaded first ferrules 16 are polished simultaneously with the end faces 28 of the blank ferrules 18. Due to the angled orientation of the ferrule holding locations 22 of the tool 20, the optical fibers 14 of the grouping of loaded first ferrules 16 are polished at an angle A3 (FIG. 7). As can be understood, the angle A3 of the optical fibers 14 is equivalent to the angle A2 of the end face 28 of the ferrules 12. (E.g., the angle A3 is typically between 5 and 10 degrees; in the illustrated embodiment, the angle A3 is about 8 degrees.)

Referring still to FIG. 6, one advantage of the present method of manufacturing the ferrule assemblies concerns the application of polishing forces generated by the polisher 30. During the second polishing operation, the grouping of blank second ferrules 18 provides greater surface area on which to apply polishing forces. By this, the end height H (FIG. 8) of the optical fibers 14 can be increased.

In particular, because of the small size of optical fibers, polishing forces can rapidly remove material from the ends of the fibers. The rapid rate at which material is removed is difficult to control in conventional manufacturing processes. In the present method, the end surfaces 28 of blank ferrules 18 reduce the rate at which material is removed from the ends of the optical fibers 14 of the loaded ferrules; and thereby offers better control and management of the resulting height of the optical fibers. Optical fibers 14 manufactured by the present method can have a protruding end height beyond that of 3 micrometers of conventionally manufactured assemblies. In the present method of manufacture, the optical fibers 14 typically have an end height H of between 3 and 18 micrometers; and preferably between 5 and 18 micrometers; however, the end height H can be significantly greater than 18 micrometers.

In addition to reducing the rate at which material is removed from the ends of the optical fibers, during the second polishing operation, the grouping of blank second ferrules 18 can also function as an indicator of the polishing depth or resulting end height H of the optical fibers 14. That is, the amount of material removed from the blank second ferrules 18 can be monitored and used as an indicator of when the optical fibers 14 of the loaded ferrules 16 have reached the desired fiber height H.

In particular, the resulting height H of the optical fibers 14 of the loaded ferrules 16 can be controlled during the second polishing operation by monitoring the amount of material removed from the end face 28 of the grouping of blank second ferrules 18. The depth of material removed from the end face 28 of the blank ferrules 18 corresponds to the height H of the optical fibers 14 of the loaded ferrules 16. For example, if the desired amount of material removed from the end faces 28 of the ferrules 12 corresponds to a depth D1 of 170 micrometers, then polishing the grouping of second blank ferrules 18 to remove an amount of material corresponding to a distance of 160 micrometers results in an optical fiber 14 having an end height H of 10 micrometers. During the second polishing operation, the height H of the optical fiber can be inspected and measured for verification.

As can be understood, the second polishing operation is stopped prior to polishing the blank second ferrules 18 to the desired depth D1. That is, the grouping of blank second ferrules 18 is only partly ground or polished in this second polishing operation. As described above, for example, the blank second ferrules 18 are polished to remove a depth of material of approximately 170 micrometers in the second polishing operation; the optical fibers 14 of the loaded ferrules 16 reaching the desired fiber height H of approximately 10 micrometers above the end face 28 of the ferrule.

After the optical fibers 14 have been polished to the desired fiber height H, the grouping of first ferrules 16, now completed ferrule assemblies 10 (FIG. 7), is removed from the tool 20. The second polishing operation is then completed by polishing the grouping of blank second ferrules 18 to the desired depth D1; for example, the blank second ferrules 18 are further polished to remove approximately 10 micrometers of addition material from the end faces 28.

Figure 9:
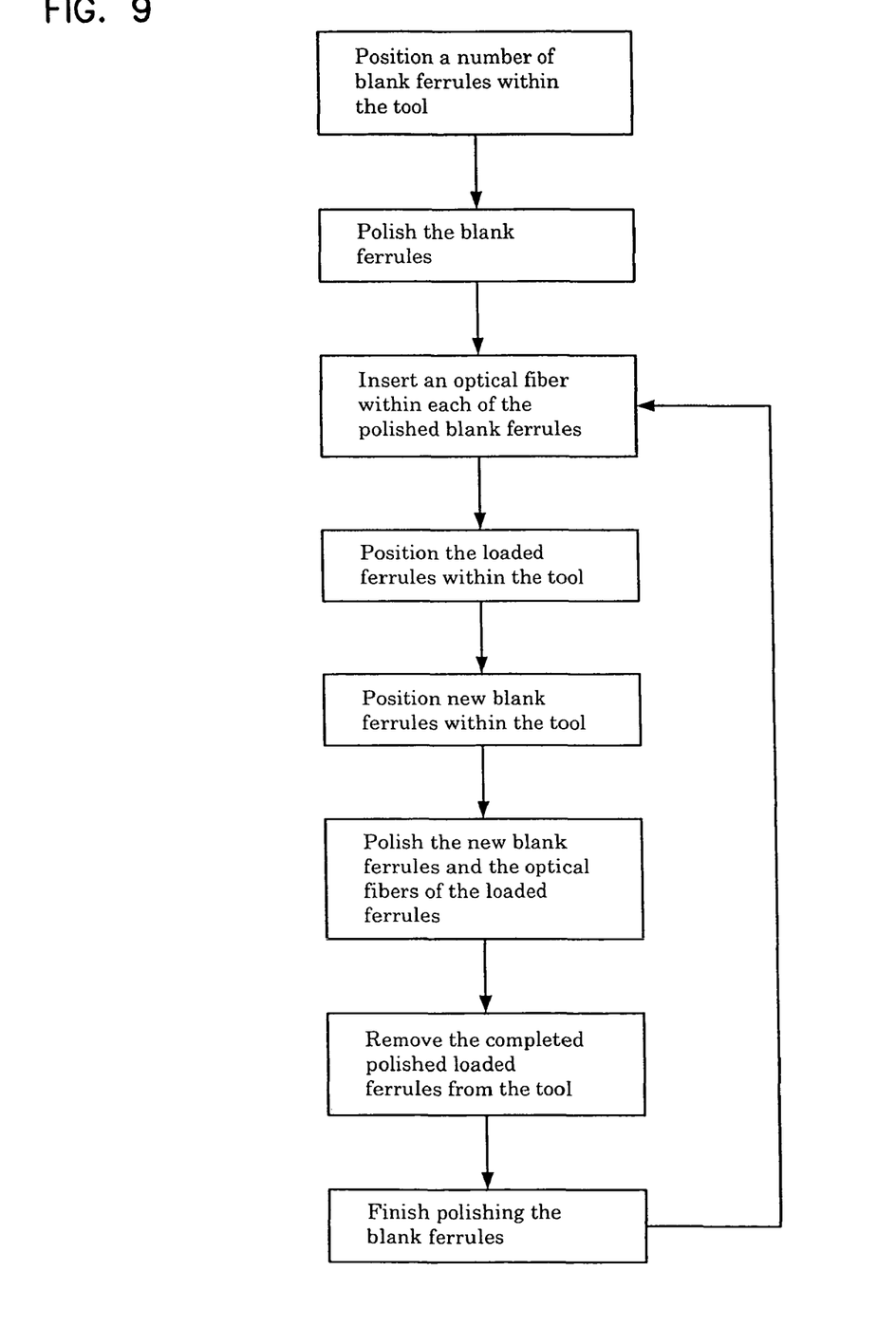
FIG. 9 is a block diagram of a method for manufacturing ferrule assemblies, in accordance with the principles disclosed.

Referring now to FIG. 9, in general, the present method includes positioning the first grouping of blank ferrules 16 within the ferrule holding tool 20. The first grouping of blank ferrules 16 is ground or polished. The optical fibers 14 are then inserted within the polished ferrules and secured in position such that the fibers 14 extend a distance beyond the polished end of the ferrules. The grouping of loaded first ferrules 16 and the second grouping of blank ferrules 18 are then positioned within the ferrule holding tool 20. The polisher 30 simultaneously polishes both the blank second ferrules 18 and the optical fibers 14 of the loaded ferrules 16. Once the desired resulting height H of the optical fibers 14 is achieved, the polished loaded ferrules 16 (i.e., the ferrule assemblies 10) are removed from the tool. The second polishing operation is then completed by finishing the polishing of the grouping of blank second ferrules 18.

After completion of the second polishing operation, the second blank ferrules 18 of the second grouping are loaded, i.e., optical fibers 14 are secured within the through bore 26 of the ferrules. The loaded ferrules are then re-positioned within the locations 22 of the tool 20, and a new grouping of blank ferrules is positioned with the remaining locations of the tool. The polisher 30 then polishes both the new blank ferrules and the optical fibers 14 of the second grouping of loaded ferrules 18. As can be understood, ferrules can be continuously cycled through both of the first and second polishing operations, as described above, resulting in groupings of completed, polished ferrule assemblies 10.

Figure 10:
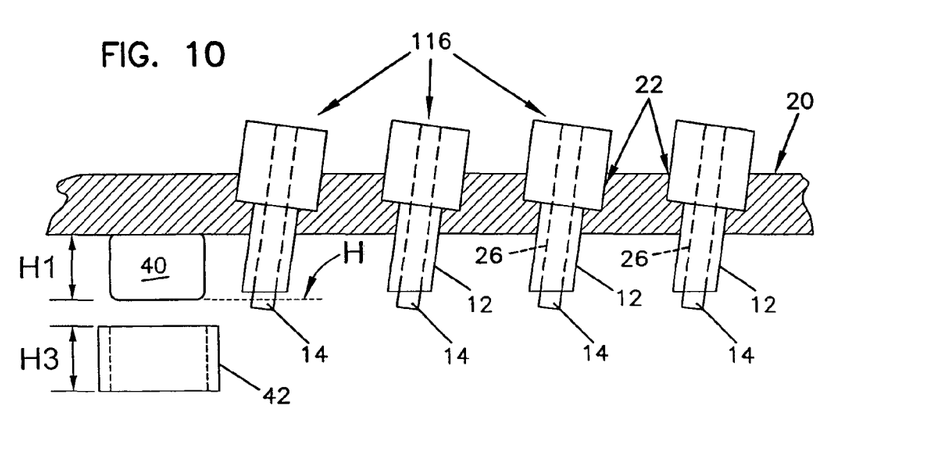
FIG. 10 is a (side view) schematic representation of an alternative step of polishing the optical fibers of loaded ferrules, in accordance with the principles disclosed.

Referring now to FIG. 10, in another variation of the present method, the first polishing operation includes pre-polishing a grouping of blank ferrules, as previously described and shown in FIG. 2. In this method variation, however, the number of blank ferrules of the grouping 116 (FIG. 10) can be equal to the number of ferrule holding locations 22. That is, the entire tool 20 can be populated with blank ferrules, as opposed to being only partly populated as previously described. After pre-polishing the grouping 116 of blank ferrules 12, optical fibers are secured within the through bores 26 of the pre-polished ferrules; the loaded ferrules then re-positioned within the tool 20.

In the second step of polishing the optical fibers, a spacer 40 is used to monitoring or controlling the desired end height H of the optical fibers 14. In the illustrated embodiment, the spacer 40 is disposed on the tool 20. The spacer 40 has a H1 corresponding to the desired end height H of the optical fibers 14. In this method variation, the desired end height H (represented by a dashed line) of the optical fibers 14 of the loaded ferrules 16 is controlled during the second polishing operation by monitoring when the polisher 30 contacts the spacer 40.

In one embodiment, the spacer 40 can be an amount of glue deposited on the tool 20 prior to each of the second polishing operations. Multiple glue spacers 40 can be deposited on the tool 20 at spaced apart locations. A tube 42, for example, can be used to construct or provide the spacer 40. In using a tube, a predetermined amount of glue corresponding to the height H1 is administered into the tube 42 and permitted to dry. The tube 42 can have a height H3 such that the tube 42 is filled to the top to provide a spacer having the height H1. Alternatively, the tube 42 can have indicia corresponding to the particular height H1 of the spacer 40. Yet in another alternative, a quick-drying predetermined amount of material can be deposited onto the tool without use of a set-up tube.

In this second method variation, the optical fibers 14 are polished to the desired fiber height H; the spacer providing the indication of when the optical fibers have reached the desired fiber height. The height H of the optical fiber can be inspected and measured during this second polishing operation for verification. After reaching the desired height, the completed ferrule assemblies 10 are removed from the tool 20 and a new grouping of blank ferrules positioned within the tool for manufacture.

The present method of manufacturing a ferrule assembly 10, including the variations described, is accomplished without removing material from the ferrule 12 after the optical fiber 14 has been secured to the ferrule. Instead, this method polishes only the optical fiber to the desired height, as opposed to removing material from the end face 28 of the associated ferrule to achieve the desired height. The additional blank ferrules, or spacer, aid in reducing the rate at which material is removed from the optical fiber, providing better control over the resulting optical fiber height. By controlling the fiber polishing process in the disclosed manner, the optical fibers of the assemblies can be manufactured with significantly increased heights, which provide better contact and connectivity between fiber optic connectors.

In the present method, there is also no requirement for special or custom-made ferrules having bumps or spacer structure that control the polished fiber height. Instead, the present method is cost-effective in that standard flat-surfaced ferrules can be utilized for the manufacture of angled ferrule assemblies.

The above specification provides a complete description of the present invention. Since many embodiments of the invention can be made without departing from the spirit and scope of the invention, certain aspects of the invention reside in the claims hereinafter appended.

What is claimed is:

1. A method of manufacturing ferrule assemblies, comprising the steps of:
   a) positioning a first number of blank ferrules, and a second number of loaded ferrules, in a ferrule holding tool; and
   b) polishing both the blank ferrules and the loaded ferrules in the same polishing operation;
   c) wherein the blank ferrules are polished to a depth, the depth providing an indication of when an optical fiber of each of the loaded ferrules has reached a desired polished fiber height.

2. The method of claim 1, wherein the step of polishing both the blank ferrules and the loaded ferrules includes polishing ends of the blank ferrule and ends of the optical fibers of the loaded ferrules at an angle.

3. The method of claim 1, wherein the step of polishing both the blank ferrules and the loaded ferrules in the same polishing operation includes polishing the optical fibers of the loaded ferrules to a desired polished fiber height of greater than 3 micrometers.

4. A method of manufacturing ferrule assemblies, comprising the steps of:
   a) positioning a number of pre-angled ferrules and a number of blank ferrules in a ferrule holding tool, the pre-angled ferrules having optical fibers that extend a distance beyond an angled end face of the pre-angled ferrules; and
   b) polishing end faces of the blank ferrule while polishing the optical fibers of the pre-angled ferrules, including polishing the optical fibers of the pre-angled ferrules to a desired fiber height without removing material from the angled end face of the pre-angled ferrules.

* * * * *